United States Patent

[11] 3,633,610

[72] Inventor: Ake Oscar Wilhelm Hellqvist
Djurhamn, Sweden
[21] Appl. No.: 66,273
[22] Filed: Aug. 24, 1970
[45] Patented: Jan. 11, 1972
[73] Assignee: Aktiebolaget Gustavsbergs Fabriker
Gustavsberg, Sweden
[32] Priority: Sept. 11, 1968
[33] Sweden
[31] 12191/68
Continuation-in-part of application Ser. No. 856,559, Sept. 10, 1969. This application Aug. 24, 1970, Ser. No. 66,273

[54] FLOAT-ACTUATED VALVE
3 Claims, 1 Drawing Fig.
[52] U.S. Cl. ................................................ 137/398, 137/433
[51] Int. Cl. ........................................................ F16k 31/22
[50] Field of Search ............................................ 137/386, 393, 395, 398, 409, 429, 433

[56] References Cited
UNITED STATES PATENTS
2,676,666  4/1954  Howe .................... 137/398 X
3,025,872  3/1962  McLerran et al. ........ 137/398

Primary Examiner—M. Cary Nelson
Assistant Examiner—David R. Matthews
Attorney—McGlew and Toren ABSTRACT: A float-actuated valve contains a vertical tube having in its bottom a narrower inlet opening. A conical valve body is arranged to move up and down in said inlet opening. The valve body is connected to a float which floats on the surface of a body of liquid. If the water surface rises the valve body will be lifted so as to reduce the free area of the inlet opening. Consequently, the rate of flow through the valve will be substantially constant. The thickest portion of the valve body is narrower than the inlet opening, and the entire valve body can, consequently, be lifted to a position above the inlet opening. In this position the liquid can flow through the full area of the inlet opening.

PATENTED JAN 11 1972          3,633,610
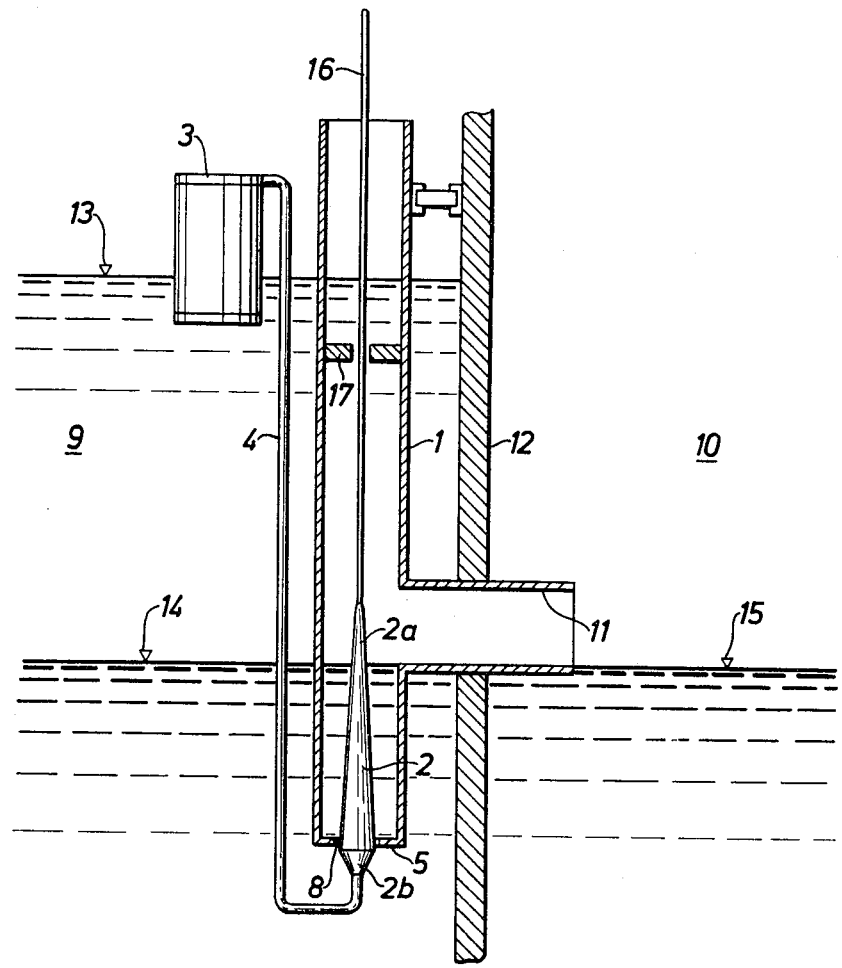
INVENTOR
ÅKE OSCAR W. HELLQVIST
BY McGlew and Toren
ATTORNEYS

FLOAT-ACTUATED VALVE

This is a continuation-in-part of application Ser. No. 856,559 filed Sept. 10, 1969.

The invention is concerned with a float-actuated valve for reducing the variations in a flow of liquid. It is the main object of the invention to provide a float-actuated valve which is useful for adjusting the supply of sewage water to an apparatus for the biological purification of such sewage water. The supply of such sewage water varies very much, and it is desired that the sewage water shall flow in a steady flow through the purification apparatus. It is another object of the invention to provide a float-actuated valve which contains a minimum of movable parts, and which operates satisfactorily in a liquid containing solid and semisolid impurities, which is often the case with sewage. It is another object of the invention to provide a float-actuated valve which, at normal conditions, produces a steady flow of liquid, and which, when the supply of liquid is abnormally high, opens, completely to let a maximum of liquid pass through the valve.

The float-actuated valve of the invention comprises a vertical tube having in its bottom a narrower portion defining an inlet opening for the liquid, an outlet tube for the liquid, said outlet tube communicating with the vertical tube and preferably being branched from the vertical tube, an upwardly tapering valve body extending through the inlet opening, the broadest portion of said valve body being narrower than said inlet opening, to permit the entire valve body to pass through the inlet opening, and a float connected to the valve body to adjust the level of said valve body relative to said inlet opening in dependence on the level of the liquid.

The invention will now be described with reference to the drawing. The float-actuated valve illustrated on the drawing is mounted on a vertical wall 12 which constitutes a partition between two compartments, viz a first compartment 9 and a second compartment 10. Both compartments contain sewage water supplied to the compartment 9 by means not illustrated. The water surface in the compartment 9 varies between a highest level 13 and a lowest level 14. The compartment 10 represents a purification apparatus, of which no details are illustrated, because said apparatus does not form part of the invention. It is desired that the sewage water shall flow through said apparatus at a steady flow and having its surface at the level 15.

The valve contains a vertical tube 1, situated in the compartment 9 and having its lower end below the lowest water level 14 and its upper end above the highest water level 13. A branch tube 11 extends horizontally from the vertical tube 1 through an opening in the wall 12 into the compartment 10. The lower wall of the branch tube 11 defines the desired water level 15 in the compartment 10. The lower end of the vertical tube 1 has a flange 5 extending inwardly and constituting a narrower portion defining an inlet opening 8 for the water in the compartment 9 into the tube 1. A valve body 2 having the general shape of a double cone extends through said inlet opening 8. The valve body 2 has an upper conical portion 2a which narrows upwardly, and a lower conical portion 2b which narrows downwardly. The broadest portion of the valve body 2 is narrower than the inlet opening 8, so that the entire valve body 2 can easily pass up and down through said inlet opening 8. Said broadest portion of the valve body 2 should preferably be situated near the lower end of the valve body, preferably at a distance from the lower end of 1/5–1/10 of the entire length of the valve body.

The lower end of the valve body 2 is fastened to the lower end of a rod 4 which extends outside of and parallel with the vertical tube 1. The upper end of the body 4 is fastened to a float 3 which floats on the water in the compartment 9. The upper end of the valve body 2 is fastened to a rod 16 which extends through a guide member 17 which keeps the rod in a vertical position and coaxial with the tube 1.

The illustrated valve operates in this way. A low water level in the compartment 9 results in a low position of the valve body 2, the top of the valve body 2 being lower than the inlet opening 8. Consequently, the water in the compartment 9 can flow through the entire opening 8 to the compartment 10. If the water level in the compartment 9 rises, the valve body 2 will also rise, thus reducing the free area of the inlet opening 8. In other words: as the difference in water levels between the compartments 9 and 10 increases, the area of the inlet opening 8 decreases, and this results in the rate of flow from the compartment 9 to the compartment 10 being substantially constant. In the position illustrated on the drawing the valve body 2 has reduced the free area of the inlet opening 8 nearly to a minimum. If the water level in the compartment 9 continues to rise, the broadest part of the valve body 2 will come to a position higher than the inlet opening 8, resulting in an increase of the free area of the inlet opening 8, and also in an increase of the rate of flow from the compartment 9 to the compartment 10. The capacity of the purification apparatus is not sufficient for this increased flow of sewage water, but such an abnormally increased flow is usually of short duration. Therefore, it is preferred to let the purification apparatus operate at a reduced efficiency for such short periods, instead of building a bigger apparatus having a capacity sufficient for a maximal supply of sewage water.

The entire quantity of sewage water has to pass through the inlet opening 8. Said inlet opening is permanently situated below the water surface. Consequently, no water has to pass from the compartment 9 to the compartment 10 via an overflow. The absence of an overflow results in the pronounced advantage that sludge and dirt floating on the surface of the sewage water in the compartment 9 cannot enter into the compartment 10.

What is claimed is:

1. A float-actuated valve for the reducing the variations in a flow of liquid, comprising a vertical tube 1 having in its bottom a narrower portion defining an inlet opening for the liquid, an outlet tube 11 for the liquid, said outlet tube 11 communicating with the vertical tube 1 and preferably being branched from the vertical tube, an upwardly tapering valve body 2 extending through the inlet opening 8, the broadest portion of said valve body being narrower than said inlet opening, to permit the entire valve body to pass through the inlet opening, and a float 3 connected to the valve body 2 to adjust the level of said valve body relative to said inlet opening 8 in dependence on the level of the liquid.

2. A valve as claimed in claim 1, in which the valve body 2 has the shape of a double cone having an upper conical portion 2a narrowing upwardly, and a lower conical portion 2b narrowing downwardly.

3. A valve as claimed in claim 2, in which the valve body 2 has its broadest portion near its lower end.

* * * * *